United States Patent
Siohan et al.

(10) Patent No.: US 9,240,918 B2
(45) Date of Patent: Jan. 19, 2016

(54) METHOD, DEVICES AND COMPUTER PROGRAM PRODUCT FOR MODULATION AND DEMODULATION DELIVERING OFDM/OQAM SYMBOLS

(71) Applicant: Orange, Paris (FR)

(72) Inventors: Pierre Siohan, Rennes (FR); Youssef Dandach, Chatillon (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 14/371,960

(22) PCT Filed: Jan. 9, 2013

(86) PCT No.: PCT/FR2013/050042
§ 371 (c)(1),
(2) Date: Jul. 11, 2014

(87) PCT Pub. No.: WO2013/104860
PCT Pub. Date: Jul. 18, 2013

(65) Prior Publication Data
US 2014/0348268 A1    Nov. 27, 2014

(30) Foreign Application Priority Data
Jan. 13, 2012   (FR) ...................... 12 50346

(51) Int. Cl.
*H04L 27/36*     (2006.01)
*H04L 27/26*     (2006.01)
*H04L 27/38*     (2006.01)

(52) U.S. Cl.
CPC .............. *H04L 27/36* (2013.01); *H04L 27/265* (2013.01); *H04L 27/2627* (2013.01); *H04L 27/2633* (2013.01); *H04L 27/2649* (2013.01); *H04L 27/2698* (2013.01); *H04L 27/38* (2013.01)

(58) Field of Classification Search
CPC ............ H04L 27/2689; H04L 27/2627; H04L 27/2649; H04L 27/265; H04L 27/264; H04L 27/36; H04L 27/38; H04L 27/2698; H04L 27/2633
See application file for complete search history.

(56) References Cited

U.S. PATENT DOCUMENTS 7,103,111 B2 *   9/2006   Park .................... H04L 5/0062
                                                                    375/296
7,609,611 B1 *  10/2009   Siohan ................. H04J 4/005
                                                                    370/208

FOREIGN PATENT DOCUMENTS

FR          2819956 A1     7/2002

OTHER PUBLICATIONS

International Preliminary Report on Patentability and English translation of the Written Opinion dated Jul. 15, 2014 for corresponding International Patent Application No. PCT/FR2013/050042, filed Jan. 9, 2013.

(Continued)

*Primary Examiner* — Sophia Vlahos
(74) *Attorney, Agent, or Firm* — David D. Brush; Westman, Champlin & Koehler, P.A.

(57) ABSTRACT

A method is provided for modulating a real data stream grouped into blocks of nb·M real data, where M is the number of carriers and nb is an integer greater than or equal to 2. The method includes, for a block of real data: a first modulation by a first modulator of the first M/2 data, delivering a first set of modulated carriers; a second modulation by a second modulator of the following (nb−1)·M data, delivering a second set of (nb−1)·M modulated carriers; a third modulation by a third modulator of the last M/2 data, delivering a third set of modulated carriers; and a superposition of the first, second and third sets, forming a block of OFDM/OQAM symbols of length nb·M/2, the first set being superposed with the start of the second set and the third set being superposed with the end of the second set.

10 Claims, 6 Drawing Sheets

(56) References Cited

OTHER PUBLICATIONS

International Search Report and English Translation of Written Opinion dated Feb. 19, 2013 for corresponding International Patent Application No. PCT/FR2013/050042, filed Jan. 9, 2013.
French Search Report and Written Opinion dated Aug. 2, 2012 for corresponding French Application No. 1250346, filed Jan. 13, 2012.
Youssef Dandach et al., "Packet transmission for overlapped offset QAM," Wireless Communications and Signal Processing (WCSP), 2010 International Conference On, IEEE, Piscataway, NJ, USA Oct. 21, 2010, pp. 1-6, XP031800069.
Pierre Siohan et al., "Analysis and Design 1-12 of OFDM/OQAM Systems Based on Filterbank Theory," IEEE Transactions on Signal Processing, IEEE Service Center, New York, NY, US, vol. 50, No. 5, May 1, 2002, XP011080136.
Pierre Siohan et al., "Analysis of OFDM/OQAM systems based on the filterbank theory," Proc. Globecom'99, Rio de Janeiro, Brazil, Dec. 1999, pp. 2279-2284.
Cyrille Siclet et al., "Design of BFDM/OQAM systems based on biorthogonal modulated filter banks," Proc. Globecom'00, San Francisco, USA, Nov. 2000, pp. 701-705.
Maurice Bellanger et al., "OFDM and FBMC transmissions techniques: a compatible high performance proposal for broadband power line communications," 2010 IEEE International Symposium on Power Line Communications and Its Applications (ISPLS) pp. 154-159, 2010.
Cyrille Siclet, "Application de la theorie des bancs de filtres a l'analyse et a la conception de modulations multiporteuses orthogonales et biorthgonales," Universite de Rennes 1 (France), these de Doctorate, soutenue le Nov. 18, 2002, pp. 77-88.
Youssef Dandach et al., "FBMC/OQAM modulators with half complexity," Proceedings Globecom'11, Texas, 2011.
Pierre Duhamel et al., "Implementation of "split-radix" FFT algorithms for complex, real and real symmetric data," IEEE International conference on Acoustics, Speech, and Signal Processing ICASSP 85, vol. 10, Apr. 1985, pp. 784-787.
Bernard Le Floch et al., "Coded Orthogonal Frequency Division Multiplex," Proceedings of the IEEE, vol. 83, pp. 982-996, Jun. 1995.
Hao Lin et al., "Modulation flexibility in PLC: A unified MCM transceiver design and implementation," IEEE Transactions on Circuits and Systems I : Regular Papers, vol. 99, 2010.

\* cited by examiner

Fig_1 (Prior Art)

METHOD, DEVICES AND COMPUTER PROGRAM PRODUCT FOR MODULATION AND DEMODULATION DELIVERING OFDM/OQAM SYMBOLS

CROSS-REFERENCE TO RELATED APPLICATIONS

This Application is a Section 371 National Stage Application of International Application No. PCT/FR2013/050042, filed Jan. 9, 2013, which is incorporated by reference in its entirety and published as WO 2013/104860 on Jul. 18, 2013, not in English.

1. FIELD OF THE INVENTION

The field of the invention is that of digital communications.

More specifically, the invention relates to the multicarrier modulation and demodulation of the OFDM/OQAM (orthogonal frequency division multiplexing/offset quadrature amplitude modulation), BFDM/OQAM (biorthogonal frequency division multiplexing/OQAM) or again FBMC/OQAM (filter bank multicarrier/OQAM) types, for which the carriers are shaped by a prototype filter.

Even more specifically, the invention pertains to multicarrier signals transmitted in the form of packets of multicarrier symbols, especially packets constituted by a very small number of multicarrier symbols.

The invention can be applied especially in the field of wireless communications such as for example communications made according to the 3GPP LTE standard in which the frames are constituted by 15 OFDM symbols or again the DVB-T2 standard according to which the shortest frames are constituted by four OFDM symbols, or again for the field of communications using online carrier current systems, of a IEEE P1901 type especially, the duration of which for signaling signals can be limited to only one OFDM symbol.

2. PRIOR ART

Multicarrier transmission techniques have numerous advantages, especially in the context of multi-path channels. Thus, OFDM type modulations are especially well suited to countering the effects of fading in the frequency selective channels.

However, the OFDM modulations have the drawback of generating a multicarrier signal having poor frequency localization and necessitating therefore the insertion of a guard interval into the time domain to limit interference. Now, the insertion of such a guard interval causes a reduction of the spectral efficiency of the multicarrier signal.

Alternative solutions have then been proposed to limit interference while at the same time removing the need for inserting a guard interval. These techniques rely on the shaping of the signal by filters (for a discretized signal) or by functions (for a continuous signal) called prototype filters or functions, enabling improved frequency localization through orthogonal properties restricted to the fields of the real values. These pertain for example to OFDM/OQAM or BFDM/OQAM type modulations classically used for radiofrequency communications as described especially in the documents by P. Siohan and N. Lacaille, "*Analysis of OFDM/OQAM systems based on the filterbank theory*", Proc. GLOBECOM'99, Rio de Janeiro, Brazil, December 1999, pp. 2279-2284, and C. Siclet and P. Siohan, "*Design of BFDM/OQAM systems based on biorthogonal modulated filter banks*", Proc. GLOBECOM'00, San Francisco, USA, November 2000, pp. 701-705.

FIG. 1 is a more precise illustration of the scheme of an OFDM/OQAM modulator 10 delivering an OFDM/OQAM type multicarrier signal. Such a signal can be represented in baseband and in discrete time in the following form:

$$s[t] = \sum_{m=0}^{M-1} \sum_{n=-\infty}^{n=+\infty} a_{m,n} h[t-n\tau] e^{j2\pi mFT} e^{j\phi_{m,n}}$$

with:
- $a_{m,n}$ being a piece of a data of real value to be transmitted on a sub-carrier m at the instant n;
- M being the number of carrier frequencies;
- $\tau = T/2$ a discrete time shift, $\tau$ being the duration of a real piece of data;
- $F = 1/T$ the spacing between the carriers;
- $h[n]$ is the prototype filter used by the modulator, with a length L, with real coefficients and linear phase;
- $\phi_{m,n}$ is a phase term chosen so as to obtain a real-part/imaginary-part alternation, enabling orthogonality, for example equal to $$\frac{\pi}{2}(n+m) + \varepsilon\pi mn,$$

with $\epsilon = \{0, \pm 1\}$.

In the case of an orthogonal OFDM/OQAM modulation, a delay D is applied such as D=L−1, with L being the length of the prototype filter. In the case of a biorthogonal BFDM/OQAM modulation, the delay D can be chosen more flexibly and can be such that D≤L−1.

As illustrated in FIG. 1, the real pieces of data $a_{m,n}$ undergo a pre-processing or a pre-modulation 11 enabling especially a time and frequency quadrature of the carriers of the multicarrier signal.

More specifically, during this pre-treatment process, the pieces of real data $a_{m,n}$ are multiplied by a first phase term in $\pi/2$, enabling the performance of a time and frequency phase shift of the carriers of the multicarrier signal, and by a second term making it possible to take account of the length of the prototype filter. The data obtained at output of this pre-treatment module denoted as $a_{m,n}^p$ can be expressed in the following form:

$$a_{m,n}^p = a_{m,n} e^{j\frac{\pi}{2}n} 2N e^{-j\frac{\pi}{2}m\frac{D-N}{N}}.$$

These pieces of data are then converted from the frequency domain into the time domain classically using an Inverse Discrete Fourier Transform (IDFT) sized M in an IDFT module 12. The modulated carriers obtained at output of the IDFT module 12 denoted as $u_{0,n}$ à $u_{2N-1,n}$ are then filtered by the prototype filter h[n] 13, then over-sampled and shifted to obtain the multicarrier signal comprising the OFDM/OQAM symbols s[k] formed by M complex samples with k such that nM≤k<(n+1)M. More specifically, the prototype filter h[n] can be expressed in polyphase form comprising M polyphase components $G_l(z)$, defined by:

$$G_l(z) = \sum_n h[l+nM]z^{-n}.$$

At reception, the symbols are demodulated by using the real part of the following scalar product for an OFDM/OQAM signal with unbounded support in continuous time:

$$\hat{a}_{m,n} = \Re\{\langle h_{m,n}, s\rangle\} = \Re\left\{\int_{-\infty}^{+\infty} h_{m,n}^*(t)s(t)dt\right\}$$

The demodulation for an OFDM/OQAM signal with a bounded support is done according to the above equation in replacing the infinite bounds of the integral here above by bounds with finite values.

For a given application (a fixed-frequency bandwidth B, a number of carriers M and a constellation $2^{2Q}$–QAM that are given), the OFDM is characterized by a fixed spectral efficiency whatever the length of the frame. By contrast, the spectral efficiency of an OFDM/OQAM signal with bounded support is given by the expression:

$$\varsigma = \frac{K}{K+q=0,5} \cdot \frac{2Q \cdot M \cdot B}{T} \text{ (bits/s/Hz)},$$

with:
K the number of symbols per frame;
M the number of carrier frequencies;
L=qT the length of the prototype filter, q being the overlapping factor;
Q: the parameter defining the order of an original QAM constellation and that of the PAM ($2^Q$) used for the data $a_{m,n}$.

This expression assumes that the frame has a length sufficient to enable the performance of the demodulation according to the previous equation when the bounds of the integral are finite.

Implicitly, the expression of the spectral efficiency here above also assumes that if the "edge symbols" are truncated, the corresponding pieces of real data cannot be retrieved.

Thus, for this expression, the longer the frame, the higher is the spectral efficiency and the more asymptotically independent is this spectral efficiency relative to the length of the frame and the overlapping factor q. However, it can also be noted that the loss of spectral efficiency becomes critical for the short frames.

Indeed, for a multicarrier transmission in the form of packets, because of the shaping filters also called prototype filters, which are spread over several symbols, the transmission support needed exceeds in duration the one which is strictly limited to the duration of the payload symbols to be transmitted.

To resolve this problem of loss of spectral efficiency, a solution aimed at attenuating the edge effects by introduction of a weighting function has been described especially in the document by M. Bellanger, M. Renfors, T. Ihalainen and C. A. F da Rocha, "*OFDM and FBMC transmissions techniques: a compatible high performance proposal for broadband power line communications*", 2010 IEEE International Symposium on Power Line Communications and its Applications (ISPLS) pp. 154-159, 2010. However, this technique increases the cost of the procedure for retrieving symbols at the ends which, in this case, are only approximately retrieved.

Another solution has been proposed in the document by Y. Dandach and P. Siohan, "*Packet Transmission for Overlapped Offset QAM*", IEEE International Conference on Wireless Communications and Signal Processing (ICWCSP), Suzhou, China, October 2010. The technique of this document enables especially a perfect retrieval in the case of a short prototype filter, whose temporal length $L_t$=T. This, in terms of a filtering "window", amounts to a filter with a window length L=M.

More specifically, this document therefore considers the critical case of a short frame, in other words with a low value of K, with a short prototype filter whose length is $L_t$=T.

As regards the expression of the spectral efficiency mentioned earlier, it can be noted that this spectral efficiency is reduced for a low value of K, especially because of the limiting factor for $$q=1, \frac{K}{K+0.5}.$$

The goal of the technique presented in the document by Y. Dandach and P. Siohan, "*Packet Transmission for Overlapped Offset QAM*", IEEE International Conference on Wireless Communications and Signal Processing (ICWCSP), Suzhou, China, October 2010, is therefore to get rid of this limiting factor.

Getting rid of this limiting factor means considering a truncation of the frame, i.e. a loss of M pieces of real data per frame, which is equivalent to M/2 pieces of complex data. For a short prototype filter whose length $L_t$=T, the piece of data affected by the truncation is $a_{m,1}$. By contrast, the piece of data $a_{m,0}$ is not affected by this truncation and can then be retrieved perfectly during the demodulation by using the expression of the scalar product mentioned here above.

However, since the truncation affects the demodulation of the piece of truncated data $a_{m,1}$ by creation of inter-carrier interference (ICI), the Dandach document proposes the transmitting, for these pieces of truncated data, of only the carriers whose index m is an even-parity or odd-parity value, which in other words amounts to cancelling out half of the sub-carriers.

Until now, this technique based on the cancellation on half of the carriers (even-parity or odd-parity carriers) of the edge data affected by the truncation, although theoretically valuable, has not been developed beyond the continuous temporal approach described here above. Furthermore, this document neither discloses nor suggests any concrete efficient implementation, in digital mode, of a modulator or demodulator enabling high spectral efficiency while at the same time limiting problems of interference.

There is therefore a need for a novel technique of modulation delivering a multicarrier signal of the OFDM/OQAM type, the implementation of which is optimized, especially in terms of complexity, and delivering OFDM/OQAM symbols capable of being transmitted according to a block transmission scheme, as in the case of OFDM, or by packets.

3. SUMMARY OF THE INVENTION

The invention proposes a novel solution that does not have all these drawbacks of the prior art in the form of a method for modulating a stream of real data, implementing a prototype filter of a length smaller than or equal to M and delivering blocks of OFDM/OQAM symbols.

According to the invention, the pieces of real data are grouped together in blocks of data of nb·M real data, where M is the number of carriers of one of the blocks of OFDM/OQAM symbols and nb is an integer greater than or equal to 2.

Furthermore, the method according to the invention comprises, for a real data block, the following steps:
- first modulation by a first modulator of the M/2 first pieces of data of the real data block, delivering a first set of modulated carriers;
- second modulation by a second modulator of the (nb−1)·M following pieces of data of the real data block, delivering a second set of (nb−1)·M modulated carriers;
- third modulation by a third modulator of the M/2 last pieces of data of the real data block delivering a third set of modulated carriers;
- superimposition of the first, second and third sets of modulated carriers after application of time shifts so as to form a block of OFDM/OQAM symbols with the length nb·M/2, the first set being temporally superimposed on the start of the second set and the third set being temporally superimposed on the end of the second set.

Thus, the invention relies on a novel and inventive approach to the modulation of a stream of real data delivering blocks of OFDM/OQAM symbols having reduced complexity and enabling an implementation suited to block transmission of OFDM/OQAM symbols.

Indeed, the use of such modulators enables an OFDM/OQAM transmission by blocks or by packets (nb>2), especially blocks or packets of small length, while at the same time ensuring a reduction of the complexity of the operations performed during the modulation because a modulator according to the invention performs a distinct treatment of the "edges" of a block of data relative to the central part of this block of data.

Defining the different sets of data to which the different modulations apply respectively amounts to applying a particular sub-division of a data block into three sub-blocks, a first and the last sub-block respectively comprising the M/2 first and last pieces of data of the block and thus representing the "sub-blocks of edges" of the data block to be modulated.

The solution according to the invention can also be applied to a system of bi-orthogonal transmission using filter banks (FBMC/OQAM).

The expression "block of data" thus encompasses both the notion of an "elementary block" when the data block has a size 2·M (nb=2), and the notion of a data "packet" when the data block has the size nb·M with nb>2.

The term "modulation" according to the invention comprises all the operations implemented in order to convert the stream of real data into modulated carriers constituting OFDM/OQAM symbols ready to be transmitted according to a transmission by blocks.

Besides, the terms "start" and "end" of the superimposition step according to the invention mean that the M/2 modulated carriers of the first set are superimposed with the M/2 first carriers of the second set and that the M/2 carriers of the third set are superimposed with the M/2 last carriers of the second set.

In addition, the method of modulation according to the invention implements a prototype filter of a length smaller than or equal to M. It is possible especially to use a prototype filter with a length L=M, i.e. the filtering temporal window of which is equal to T, T being the duration of a symbol. Such a prototype filter makes it possible especially to ensure the orthogonality of the system. It must be noted that the implementing of a prototype filter with a length smaller than M (L<M) of course introduces a loss of orthogonality of the system, but this loss can be compensated for by classic techniques, for example by replacing the edge coefficients (with index L−M) of the orthogonal filters by a few zeros, in other words by adding zero filter coefficients so as to obtain a filter with a length L=M.

According to one particular characteristic of the invention, the method of modulation according to the invention comprises a switching step for feeding, for each real data block:
- the input of the first modulator with the M/2 first pieces of data of the real data block;
- the input of the second modulator with the (nb−1)·M following pieces of data of the real data block;
- the input of the third modulator with the M/2 last pieces of data of the real data block.

Thus, according to this particular aspect, the invention provides for a cadencing of the respective implementation of the three modulators. It must be noted that it is possible to carry out a successive switching that is continuous, or again discontinuous, between the three modulators. Furthermore, it can also be envisaged to process first of all the edges, namely to implement a first and third modulator and then the second modulator.

According to another particular aspect of the invention, the first and third modulations implement forward fast Fourier transforms or inverse fast Fourier transforms (FFTs or IFFTs) fed with M pieces of parallel data, one in two of which is forced to zero.

This implementation makes it possible especially to reduce the complexity of the forward or inverse fast Fourier transforms implemented by the first and third modulators.

Indeed, according to this particular aspect of the invention, one in two inputs of the forward or inverse fast Fourier transforms is forced to zero, thus reducing the number of operations implemented by the first and third modulators.

According to the invention, a forward or inverse fast Fourier transform can be used for the modulation. The modifications that must respectively be implemented to apply either of these forward or inverse transforms during the modulation are especially described in the document by C. Siclet, "*Application de la théorie des bancs de filtres à l'analyse et à la conception de modulations multiporteuses orthogonales et biorthogonales*" (Application of the theory of filter banks to the analysis and design of orthogonal and bi-orthogonal multicarrier modulations), University of Rennes 1 (France), PhD thesis defended on 18 Nov. 2002, and correspond especially to modifications of the phase terms implemented.

According to one particular aspect of the invention, the method implements a prototype filter with a length smaller than or equal to M carrying out two distinct type of filtering, one applied to the second set of (nb−1)·M modulated carriers and the other applied to the first set of modulated carriers and to the third set of modulated carriers delivering a first and a third set each comprising M/2 filtered modulated carriers.

Thus, the invention enables the use of a same prototype filter applied to the first, second and third sets of modulated carriers and therefore makes it possible to reduce the complexity of the filtering step.

Indeed, owing to the preliminarily performed modulation processing, the filtering of the first and third sets of modulated carriers is limited to M/2 operations of multiplication, while the filtering implemented for the second set of (nb−1)·M modulated carriers amounts to applying (nb−1) times a conventional filtering of a length L=M on the second set of modulated carriers.

According to another aspect of the invention, the first and third modulations respectively implement an expansion of the M/2 first pieces of data of the real data block and the M/2 last pieces of data of the real data block, the expansion consisting in inserting a zero between each of the M/2 first pieces of data of the block and each of the M/2 last pieces of data of the real data block respectively delivering, at input of the forward or inverse fast Fourier transforms of the first and third modulations, M expanded first pieces of data of the block and M expanded last pieces of data of the real data block, of which one in two pieces of data is forced to zero.

This expansion step makes it possible especially to use the classic series/parallel converters of a modulator and to force the inputs of the corresponding forward or inverse fast Fourier transforms to zero.

According to another particular aspect of the invention, the first modulation comprises the following successive sub-steps:

expanding M/2 first pieces of data of the block, the expansion consisting of the insertion of a zero between each of the M/2 first pieces of data of the block delivering M expanded first pieces of data of the real data block, series/parallel conversion of the M expanded first pieces of data of the real data block, delivering M parallel pieces of data at output of a first series/parallel converter, implementing a forward or inverse fast Fourier transform (FFT or IFFT) fed with the M pieces of parallel data output from the first series/parallel converter of which one in two is forced to zero by the operation of expansion of the M/2 first pieces of data, delivering M first modulated carriers, filtering applied to the M first modulated carriers, delivering M/2 first filtered modulated carriers, parallel/series conversion of the M/2 first filtered modulated carriers delivering the first set of modulated carriers, the second modulation comprising the following successive sub-steps:

series/parallel conversion of the (nb−1)·M following pieces of data of the real data block, delivering (nb−1)·M pieces of parallel data at output of a second series/parallel converter, implementing (nb−1) successive forward or inverse fast transforms (FFT or IFFT) fed with said (nb−1)·M pieces of parallel data at output of said second series/parallel converter delivering (nb−1)·M second modulated carriers, filtering of length M applied to said (nb−1)·M second modulated carriers delivering (nb−1) sets of M second filtered modulated carriers, series/parallel conversion of said (nb−1) sets of M second filtered modulated carriers delivering the second set of (nb−1)·M modulated carriers, and the third modulation comprises the following successive sub-steps:

expansion of the M/2 last pieces of data of the block, the expansion consisting of the insertion of a zero between each of the M/2 last pieces of data of the real data block, delivering M third pieces of expanded data of the block;

series/parallel conversion of the M third pieces of expanded data of the real data block, delivering the M pieces of parallel data at output of a third series/parallel converter, implementing a forward or inverse fast Fourier transform (FFT or IFFT) fed with the M pieces of parallel data at output of the third series/parallel converter, one in two of which is forced to zero by the operation of expansion of the M/2 last pieces of data delivering M third modulated carriers, filtering applied to the M third modulated carriers delivering M/2 third filtered modulated carriers, parallel/series conversion of the M/2 third filtered modulated carriers delivering the third set of modulated carriers.

Thus, all the traditional modules implemented by the modulator, namely the series/parallel converters, operators using forward or inverse Fourier transforms, parallel/series converters, implement a specific processing for each of the three "sub-blocks" of the data block of nb·M pieces of real data.

This selective processing makes it possible to carry out a selective modulation processing of the edges of an elementary real data block relative to the central part of this elementary real data block.

It must be noted that the step of implementing (nb−1) successive forward or inverse fast Fourier transforms (FFT or IFFT) fed with the (nb−1)·M pieces of parallel data output from the second series/parallel converter, delivering (nb−1)·M second modulated carriers, is performed on (nb−1) durations T.

According to one embodiment, the method according to the invention furthermore comprises a step of multiplication by a factor equal to $\sqrt{2}$ of the amplitude of the M/2 first pieces of data of the real data block and of the M/2 last pieces of data of the real data block.

This step of amplification by multiplication makes it possible to compensate for the reduction of power introduced into the modulator owing to the cancellation of one sub-carrier in two. The factor $\sqrt{2}$ is aimed especially at equitably distributing the amplification between transmission and reception in order to avoid an amplification of the noise at reception.

Advantageously, the first and third modulations implement forward or inverse fast Fourier transforms (FFT or IFFT) fed with M pieces of parallel data, of which the pieces of parallel data with odd-parity indices are forced to zero.

Thus, according to this particular implementation, only a quarter of the outputs of the forward or inverse fast Fourier transform used for the first and third modulation is necessary to compute the totality of the outputs, thus reducing the overall complexity of the system.

The invention also pertains to a method for demodulating an OFDM/OQAM type multicarrier signal comprising blocks of OFDM/OQAM symbols obtained by the previously described method of modulation. Such a method of demodulation implements a prototype filter with a length smaller than or equal to M and delivering a stream of real data.

According to the invention, the pieces of real data delivered by the demodulation are grouped together in blocks of nb·M pieces of real data, where M is the number of carriers of one of the OFDM/OQAM symbols and nb is an integer greater than or equal to 2.

Furthermore, according to the invention, the method of demodulation comprises, for a received block of OFDM/OQAM symbols with a length nb·M/2, the following steps:

extracting first, second and third sets of modulated carriers from the block of OFDM/OQAM symbols after application of time shifts, so as to obtain a first set of M/2 first modulated carriers, a second set of nb·M/2 modulated carriers and a third set of M/2 last modulated carriers;

first demodulation by a first demodulator of the first set of M/2 first modulated carriers delivering M/2 first pieces of data of a real data block corresponding to the received OFDM/OQAM symbol;

second demodulation by a second demodulator of the second set of nb·M/2 modulated carriers delivering (nb−1)·M following pieces of data of the real data block;

third demodulation by a third demodulator of the third set of M/2 last modulated carriers delivering M/2 last pieces of data of the real data block.

According to another aspect, the invention also pertains to a device for modulating a stream of real data, implementing a prototype filter with a length smaller than or equal to M and delivering blocks of OFDM/OQAM symbols.

According to the invention, the pieces of real data are grouped together in blocks of nb·M pieces of real data, where M is the number of carriers of a block of OFDM/OQAM symbols and nb an integer greater than or equal to 2.

Furthermore, a device for modulating according to the invention comprises the following means implemented for a real data block:

first means of modulation by a first modulator of the M/2 first pieces of data of the real data block delivering a first set of modulated carriers;
second means of modulation by a second modulator of the (nb−1)·M following pieces of data of the real data block, delivering a second set of (nb−1)·M modulated carriers;
third means of modulation by a third modulator of the M/2 last pieces of data of the real data block, delivering a third set of modulated carriers;
means for superimposing first, second and third sets of modulated carriers, after application of time shifts, so as to form a block of OFDM/OQAM symbols with a length nb·M/2, the first set being superimposed temporally on the start of the second set and the third set being superimposed temporally on the end of the second set.

Such a modulation device is especially suited to implementing the modulation method described here above.

Such a modulation device can of course comprise the different characteristics pertaining to the method of modulation according to the invention, which can be combined or taken in isolation. Thus, the characteristics and advantages of this modulation device are similar to those of the method of modulation and are therefore not described in more ample detail.

According to yet another aspect, the invention pertains to a device for demodulating an OFDM/OQAM type multicarrier signal comprising blocks of OFDM/OQAM symbols obtained by the method of modulation described here above, implementing a prototype filter of a length smaller than or equal to M and delivering a stream of real data.

According to the invention, the pieces of real data delivered are grouped together in data blocks in nb·M pieces of real data, where M is the number of carriers of one of the blocks of OFDM/OQAM symbols and nb is an integer greater than or equal to 2.

Furthermore, such a demodulation device comprises, for a received block of OFDM/OQAM symbols with a length nb·M/2:

means for extracting first, second and third sets of modulated carriers of the block of OFDM/OQAM symbols, after application of time shifts, so as to obtain a first set of M/2 first modulated carriers and a second set of nb·M/2 modulated carriers and a third set of M/2 last modulated carriers;
first means of demodulation by a first demodulator of the first set of M/2 first modulated carriers delivering M/2 first pieces of data of a real data block corresponding to the received block of OFDM/OQAM symbols;
second means of demodulation by a second demodulator of the second set of nb·M/2 modulated carriers delivering (nb−1)·M following pieces of data of the real data block;
third means of demodulation by a third demodulator of the third set of M/2 last modulated carriers delivering M/2 last pieces of data of the real data block.

Such a device for demodulating is especially suited to implementing the method of demodulation described here above.

The invention also pertains to a computer program comprising instructions for implementing a method for modulating or demodulating as described here above when the program is executed by a processor.

Indeed, the method of modulation or demodulation according to the invention can be implemented in various ways, especially in integrated, wired and/or software form.

4. LIST OF FIGURES

Other features and advantages of the invention shall appear more clearly from the following description of a particular embodiment given by way of a simple, illustrative and non-exhaustive example and from the appended drawings, of which:

FIG. 1 described with reference to the prior art, presents a classic OFDM/OQAM modulation scheme;

Figure 5:
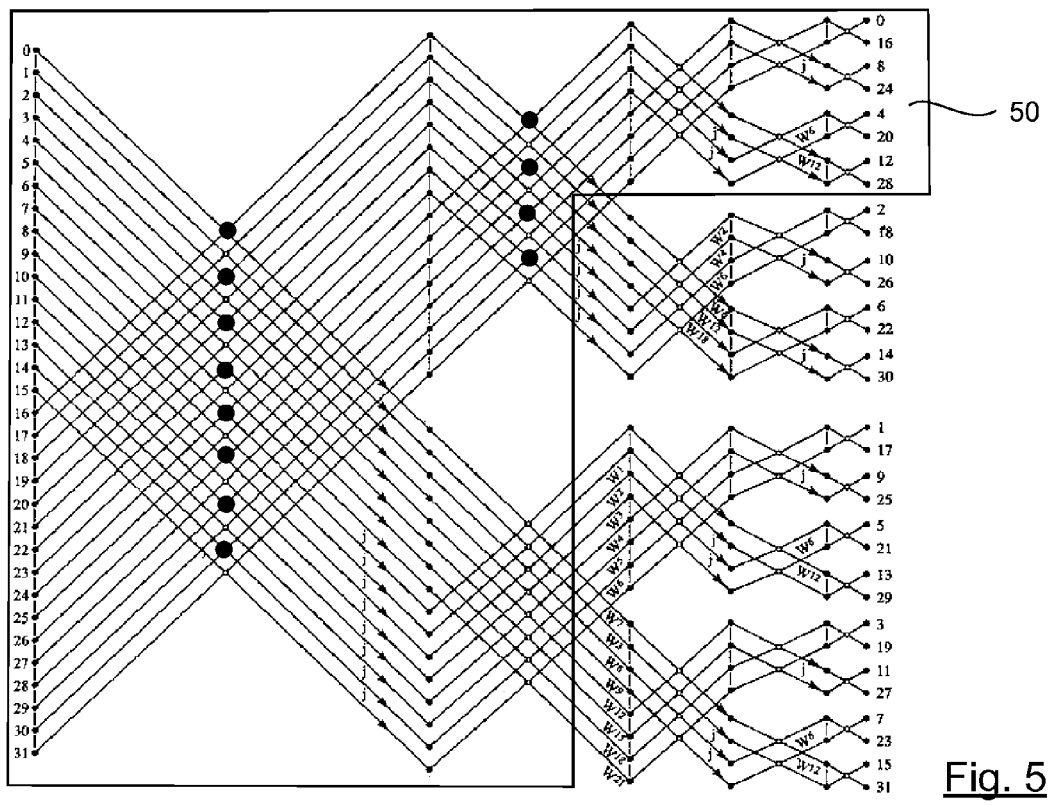
Figure 6:
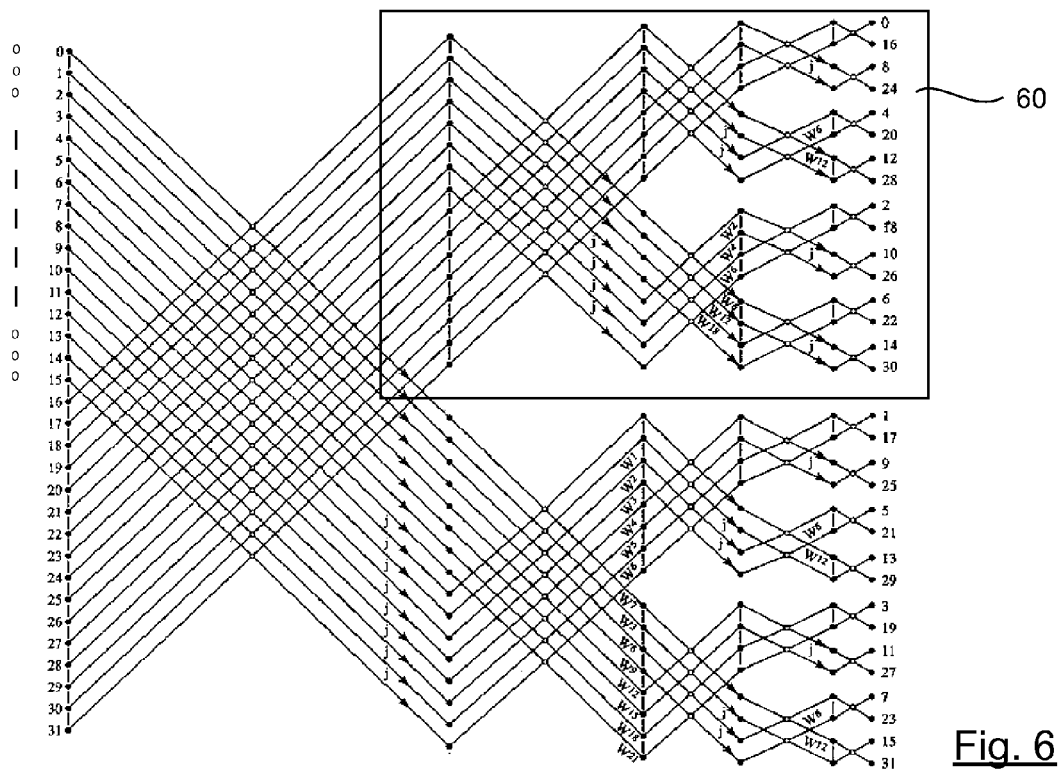
Figure 7:
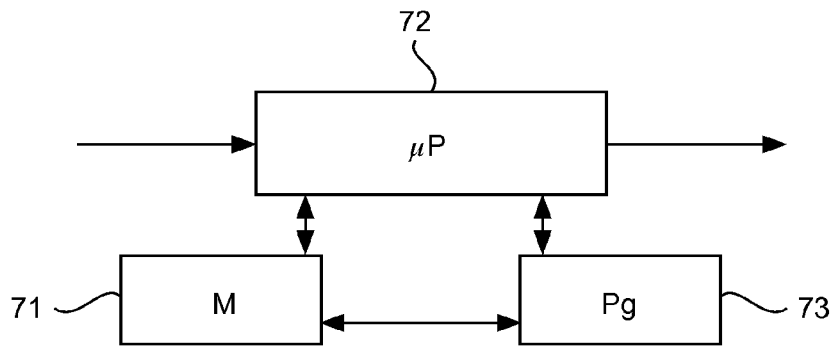
Figure 8:
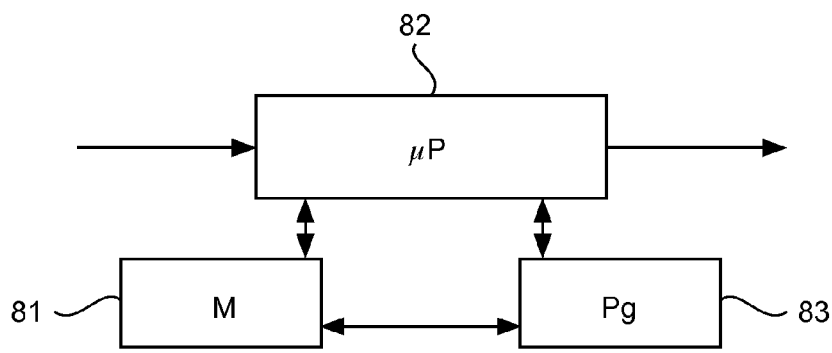
Figure 9:
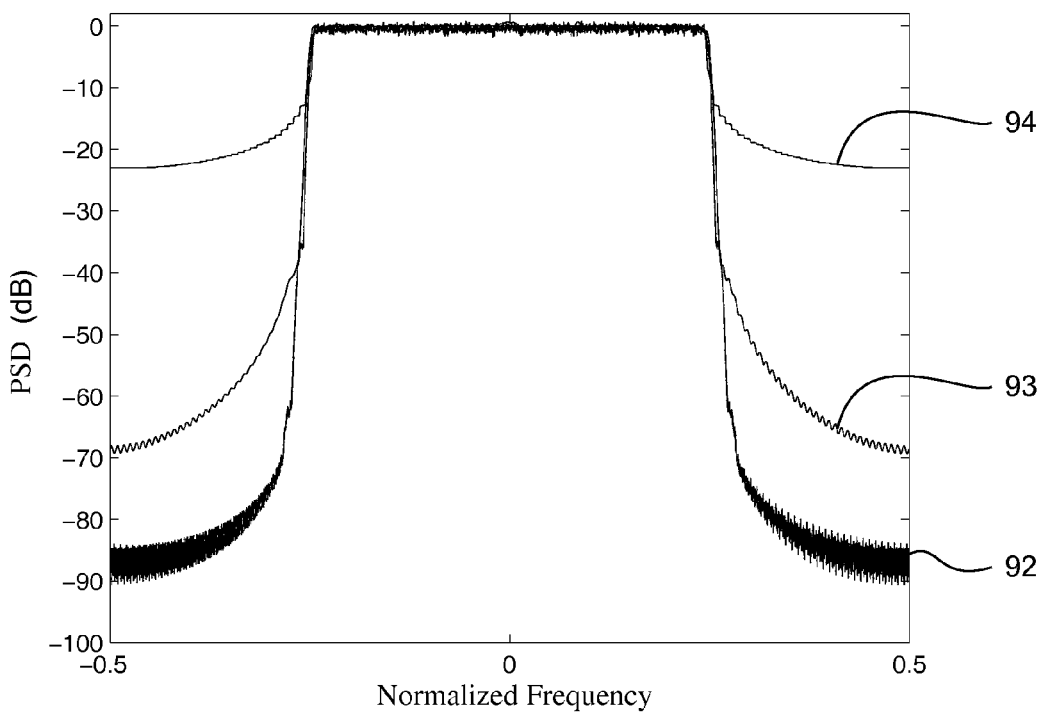

FIGS. 5 and 6 respectively represent the algorithm implemented for an IFFT and an FFT according to one particular embodiment of the invention;

FIGS. 7 and 8 present the simplified structure of a modulator and a demodulator implementing respectively a method for modulating and a method for demodulating according to one embodiment of the invention;

FIG. 9 shows the performance obtained for different sizes of data blocks.

5. DESCRIPTION OF ANOTHER EMBODIMENT OF THE INVENTION

5.1 General Principle

The invention is situated in the context of transmission systems implementing an OFDM/OQAM or BFDM/OQAM type modulation and implementing prototype filters of a length smaller than or equal to M, and proposes a technique making it possible to deliver OFDM/OQAM symbols capable of being transmitted by blocks.

It can be noted that these systems of modulation, which can be implemented in the form of filter banks, are also called FBMC/OQAM (filter bank multicarrier/OQAM) filters.

The general principle of the invention relies on a selective and distinct modulation of the "edges" of a block relative to the central part of this data block.

To achieve this, the invention defines different sub-sets of data of a data block considered, the size of which corresponds to the size of the blocks desired for the OFDM/OQAM transmission by blocks.

According to the invention, the expression "data blocks" encompasses both the notion of "elementary block" when the data block has a size 2M (nb=2), and the notion of "packet" of data when the data block has a size nb·M with nb>2.

To each of these sets, a different modulation is applied. This can be likened to the applying of an additional sub-division of a data block into three sub-blocks, the first and third sub-block comprising the M/2 first and last pieces of data of the data block considered and thus representing the "edge sub-blocks" of the data block to be modulated.

As shall be seen here below, the use of selective processing of the edges relative to the central part of the data block reduces the complexity of the set of operations implemented by the modulation system, and this runs counter to the preconceptions of those skilled in the art who would on the contrary would have believed that implementing an additional and distinct processing of the edges relative to the central part of the data block would increase the complexity implemented.

5.2 Example of Implementation
5.2.1 System of Modulation

Figure 1:
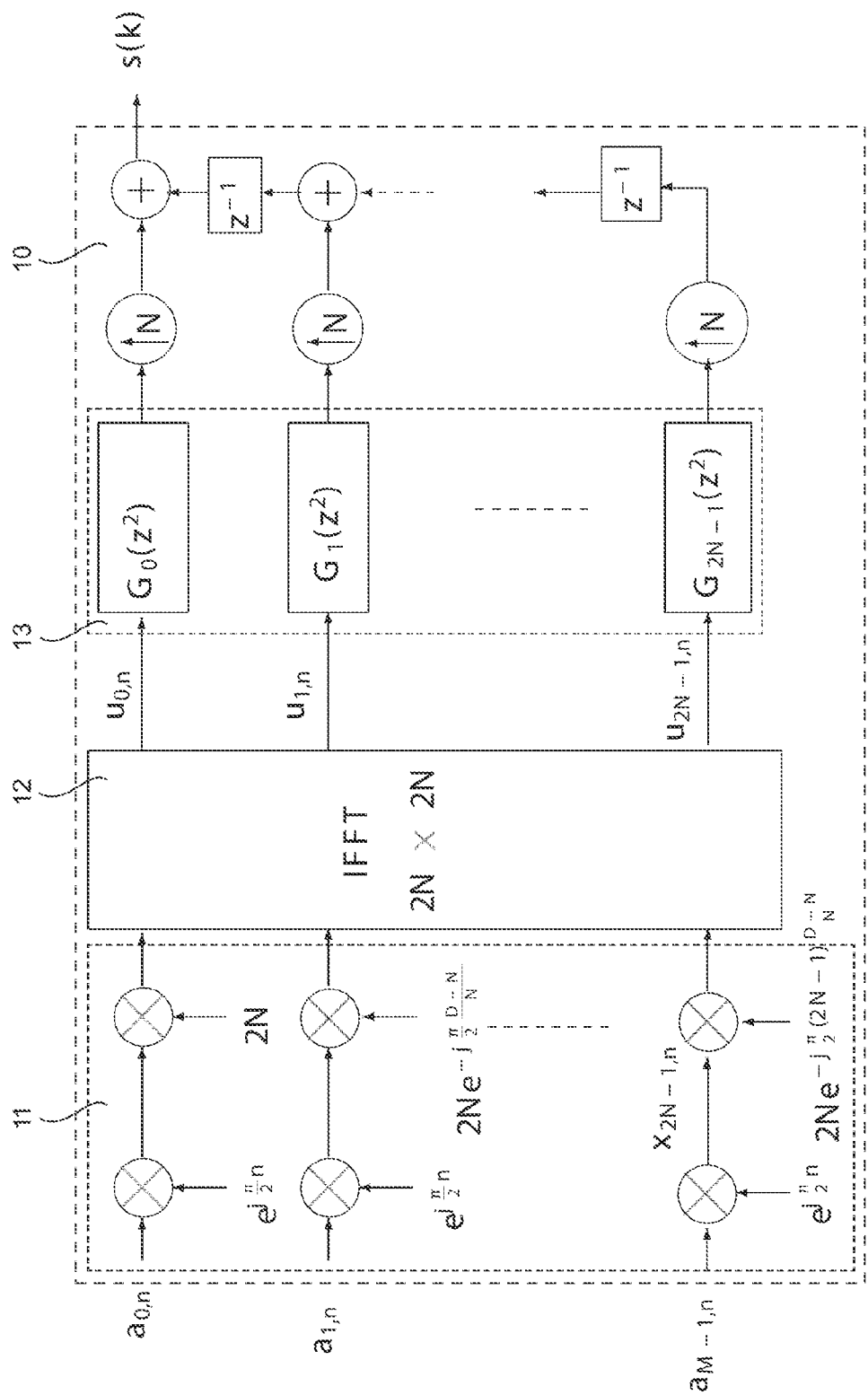

On the basis of the modulation system illustrated in FIG. 1, already described with reference to the prior art, the inventors of the present patent application, who are also the inventors of the patent application FR 1151590 filed on 28 Feb. 2011 on behalf of the same Applicant, have highlighted in the above-mentioned patent application, particular relationships between the different outputs of the frequency/time conversion modules 12 and the polyphase filtering module 13 implemented at the transmission.

More specifically, they have shown that the outputs of the frequency/time conversion module are conjugate two by two, and that the polyphase components of the prototype filter are para-conjugate two by two.

Furthermore, according to the document cited here above, Y. Dandach and P. Siohan, "*Packet Transmission for Overlapped Offset QAM*", IEEE International Conference on Wireless Communications and Signal Processing (ICWCSP), Suzhou, China, October 2010, the authors of which are also the inventors of the present patent application, it was also shown that cancelling half of the truncated OFDM/OQAM symbol carriers during the transmission enables the retrieval, at demodulation, of all the OFDM/OQAM symbols transmitted.

It is therefore possible to use this symmetry and these properties to reutilize a part of the results of the multiplications occurring at different instants of filtering, and thus reduce the complexity of the filtering and therefore the overall complexity of the system.

It is also possible according to the invention to use these relationships to reduce the complexity of the modulator by blocks, each block of which contains the equivalent of an OFDM symbol, i.e. M pieces of complex data.

Figure 2:
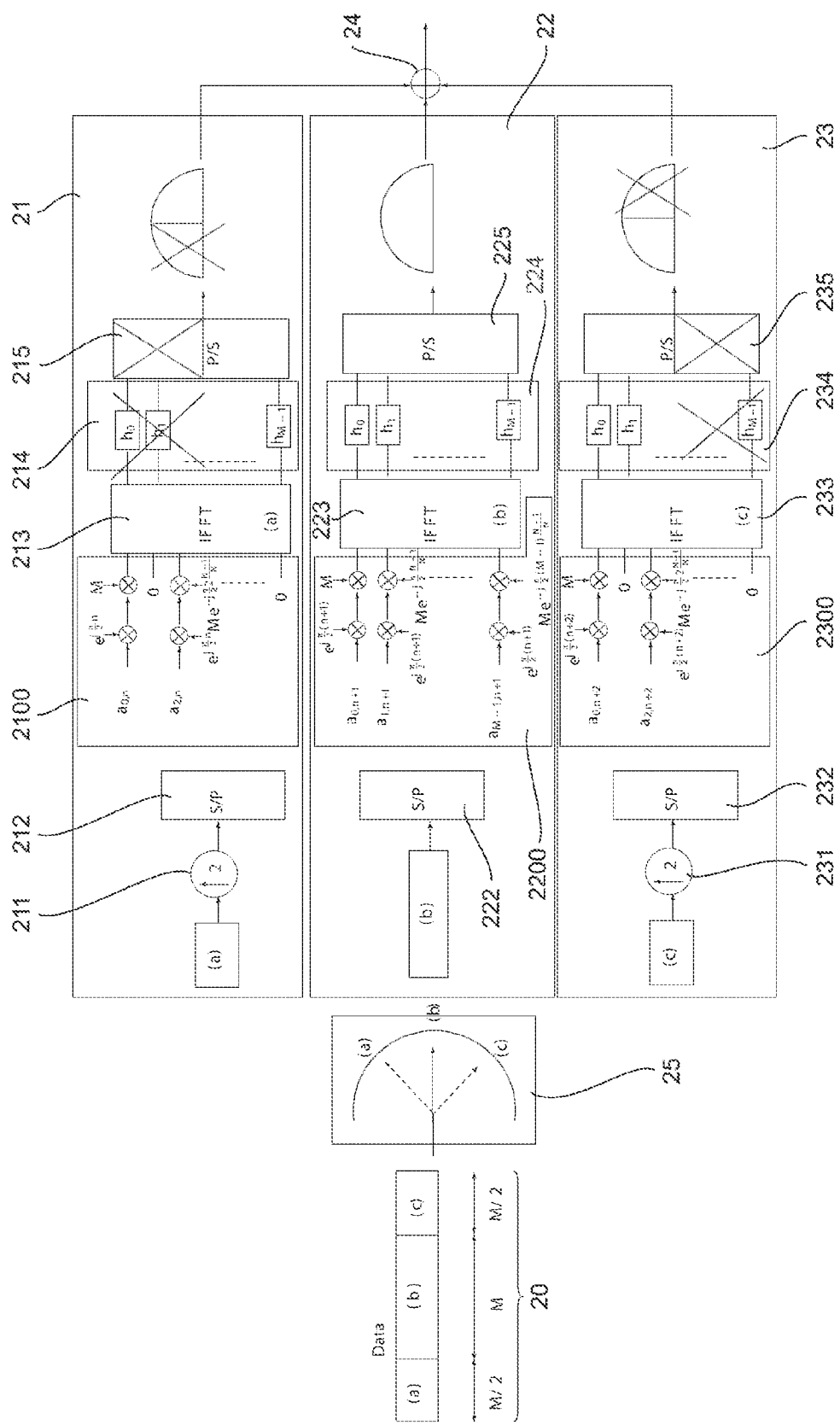
FIG. 2 illustrates the method of modulation according to one embodiment of the invention.

FIG. 2 illustrates the principle of modulation of a stream of real data delivering the OFDM/OQAM symbols capable of being transmitted by blocks of nb·M pieces of data. For example, for the case represented with reference to FIG. 2, it is considered that nb=2, i.e. that the stream of data is sub-divided into "elementary blocks" sized 2M.

According to this implementation of the invention, it is assumed especially that the input data of the modulator correspond to real OQAM symbols coming from a QAM constellation.

Figure 3A:
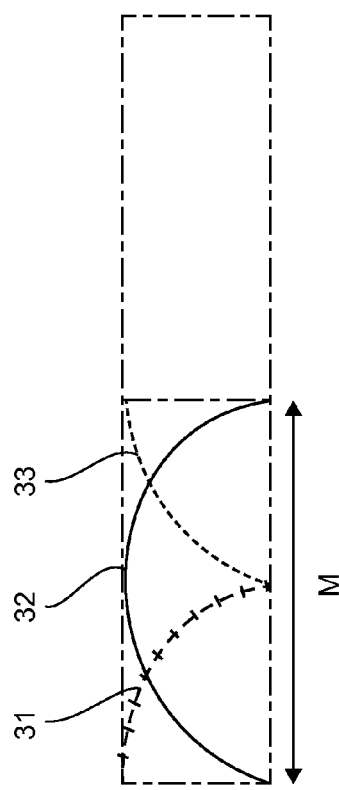
FIGS. 3A and 3B represent the blocks of symbols generated by the OFDM/OQAM modulator according to the invention for different sizes of real data blocks, namely nb=2, or nb=4.

The block modulator therefore implements the method of modulation according to the invention by implementing chiefly, for a real data block (20), the following steps:
- first modulation (21) by a first modulator of the M/2 first pieces of data (a) of the real data block (20) delivering a first set of modulated carriers;
- second modulation (22) by a second modulator of the (nb−1)·M following data (b) of the real data block (20) delivering a second set of (nb−1)·M modulated carriers;
- third modulation (23) by a third modulator of the M/2 last data (c) of the real data block (20) delivering a third set of modulated carriers;
- superimposition (24) of the first, second and third sets of modulated carriers after application of time shifts, so as to form a block of OFDM/OQAM symbols of a length nb·M/2, the first set being temporally superimposed with the start of the second set and the third set being temporally superimposed with the end of the second set, as illustrated respectively by FIG. 3A.

Referring to FIG. 3A for nb=2, it can be seen especially that the 3M/2 modulated carriers of the first set (31, shown in a "hash" line) are superimposed (24) with the M/2 first modulated carriers of the second set (32, shown in an unbroken line), and that the M/2 modulated carriers of the third set (33, shown in a dashed line) are superimposed with M/2 last modulated carriers of the second set (32, represented in an unbroken line). This superimposition thus forms a block, called an elementary block, with a length M comprising an OFDM/OQAM symbol delivered by the modulation according to the invention of a block of 2·M real data. Such an "elementary block" therefore comprises 2·M modulated carriers superimposed on a length M of the elementary block.

Furthermore, according to the embodiment shown with reference to FIG. 2, the method of modulation according to the invention comprises a switching step (25) feeding, for each block:
- the input of the first modulator with the M/2 first pieces of data (a) of the block (20);
- the input of the second modulator with the (nb−1)·M following data (b) of the block (20);
- the input of the third modulator with M/2 last data (c) of the block (20).

This switching sets up a cadencing, in feeding the first modulator on a duration T/2, the second modulator on a duration (nb−1)·T, and the third modulator on a duration T/2.

Thus, the application of a different modulation to three sets of distinct data of the block (20) can be likened to the application of an additional sub-division of a data block into three sub-blocks, the first (a) and the last (c) sub-block comprising the M/2 first and last pieces of data of the block (20) of data considered and thus representing the "sub-blocks of edges" of the data block to be modulated.

Besides, and more specifically, the first modulation (21) comprises the following successive sub-steps:
- expansion (211) of the M/2 first pieces of data (a) of the real data block (20), the expansion consisting of the insertion of a zero between the each of the M/2 first pieces of data of the block (20) delivering M first pieces of expanded data of the block (20);
- series/parallel conversion (212) of the M expanded first pieces of data of the real data block (20) delivering M pieces of parallel data at output of a first series/parallel converter;
- implementing an inverse fast Fourier transform (213)) fed with the M parallel pieces of data at output of the first series/parallel converter, of which one in two is forced to zero by the operation of expansion of the M/2 first pieces of data delivering M first modulated carriers;
- filtering (214) applied to the M first modulated carriers delivering M/2 first filtered modulated carriers;
- parallel/series conversion (215) of the M/2 first filtered modulated carriers delivering a first set of modulated carriers (31) as represented in a hash line in FIG. 3A.

Besides, according to this embodiment and classically, in considering for example a prototype filter with a length L=M, the expanded data derived from the expansion step (211) are first of all multiplied (2100) by the terms $$e^{j\frac{\pi}{2}pt}$$

with pt representing the temporal index and $$Me^{-j\frac{\pi}{2}\cdot 2m\frac{N-1}{N}}$$

with m, being the index of the piece of data considered. It must be noted that according to other embodiments, not shown, non-causal schemes using multiplication by different exponentials could also be used.

Furthermore, as indicated here above with reference to the document by C. Siclet, "*Application de la théorie des bancs de filtres à l'analyse et à la conception de modulations multiporteuses orthogonales et biorthogonales*" (Application of the theory of filter banks to the analysis and design of orthogonal and bi-orthogonal multicarrier modulations), University of Rennes 1 (France), PhD thesis defended on 18 Nov. 2002, it is possible to use an FFT instead of the IFFT represented in FIG. 2.

Besides, the second modulation (22) comprises the following successive sub-steps:
- series/parallel conversion (222) of (nb−1)·M following data (b) of the real data block (20) delivering (nb−1)·M parallel data at output of a second series/parallel converter,
- implementing (nb−1) successive inverse fast Fourier transforms (223) fed with the (nb−1)·M parallel data at output of the second series/parallel converter delivering (nb−1)·M second modulated carriers, i.e. on (nb−1) durations T, when nb=2 as represented herein, only one inverse fast Fourier transform is therefore implemented, and when (in the case not shown) nb=4, three inverse fast Fourier transforms will be implemented,
- filtering with a length M (224) applied to the (nb−1)·M second modulated carriers delivering (nb−1) sets of M second filtered modulated carriers,
- parallel/series conversion (225) of the (nb−1) sets of M second filtered modulated carriers delivering the second set of (nb−1)·M modulated carriers.

In the same way as mentioned here above, the pieces of data at input of the inverse fast Fourier transform used (22) are preliminarily multiplied (2200) by exponential factors such as those mentioned for example here above.

Furthermore, as indicated here above, instead of the inverse fast Fourier transform (IFFT) shown in FIG. 2, it is also possible to use a forward fast Fourier transform (FFT).

Furthermore, the third modulation (23) comprises the following successive sub-steps:
- expansion (231) of the M/2 last pieces of data (c) of the real data block, the expansion consisting of the insertion of a zero between each of the M/2 last pieces of data (c) of the block (20) delivering M third pieces of expanded data of the block,
- series/parallel conversion (232) of the M third pieces of expanded data of the real data block delivering M parallel data at output of a third series/parallel converter,
- implementing an inverse fast Fourier transform (223) fed with the M pieces of parallel data at output of the third series/parallel converter, of which one in every two is forced to zero by the operation of expansion of the M/2 last pieces of data (c) delivering M third modulated carriers,
- filtering (234) applied to M third modulated carriers delivering M/2 third filtered modulated carriers,
- parallel/series converter (235) of the M/2 third filtered modulated carriers delivering the third set of modulated carriers.

In the same way as mentioned here above, the pieces of data at input of the inverse fast Fourier transform module used (233) are preliminarily multiplied (2300) by exponential factors as those mentioned here above for example.

Furthermore, as indicated here above, it is also possible, instead of the inverse fast Fourier transform (IFFT) shown in FIG. 2, to use a forward fast Fourier transform (FFT).

In this particular embodiment, the outputs of the three series/parallel converters (212, 222, 232) will respectively feed the three inputs of the forward or inverse fast Fourier transform (213, 223, 233).

According to the embodiment shown with reference to FIG. 2, the first and third Fourier transformed modules work in respectively feeding the three inputs of the forward or inverse fast Fourier transform modules (213, 223, 233) on a duration T, (nb−1)·T and T.

Indeed, according to the embodiment shown with reference to FIG. 2, the input data of each sub-block (a), (b) (c) denoted $a_{m,n+i}$ with i=0, 1 or 2 are processed at instants that are multiples of T/2.

All these processing operations output the OFDM/OQAM signal constituted by independent blocks shown in FIG. 3A.

Furthermore, because of the T/2 shift at input of the inverse fast Fourier transform (IFFT or forward FFT), the superimposition is done truly in taking account of this shift not shown in FIG. 2.

Figure 3B:
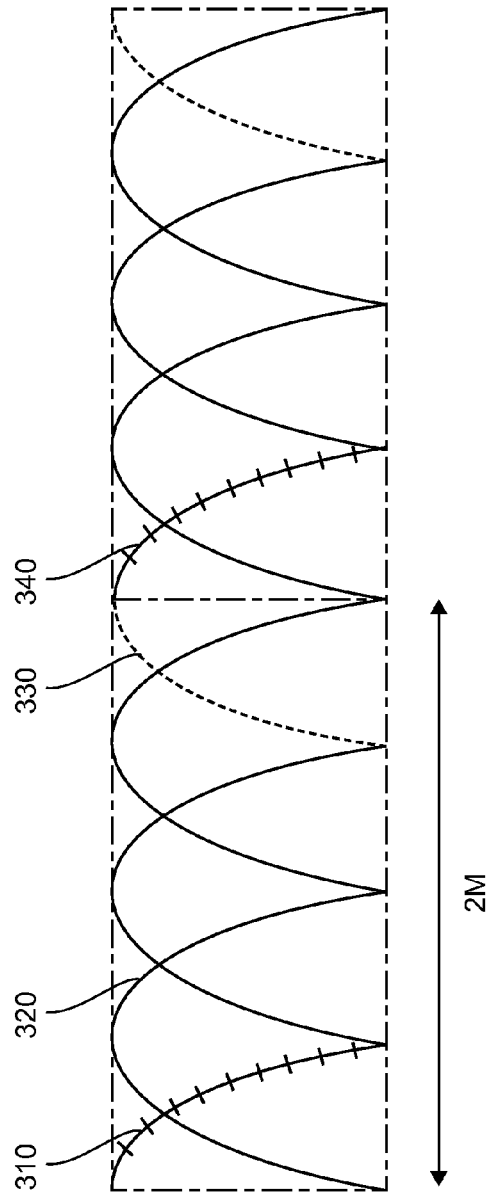

Besides, FIG. 3B represents the symbols generated by the OFDM/OQAM modulator according to the invention for nb=4, i.e. for a real data block comprising 4·M data. It can be noted especially that the M/2 modulated carriers of the first set (310 represented in hash lines) are superimposed (24) with the M/2 first modulated carriers of the second set (320 shown in an unbroken line) and that the M/2 modulated carriers of the third set (330 shown in dashed lines) are superimposed with the M/2 last modulated carriers of the second set (320 shown in an unbroken line), the second set comprising 3·M pieces of data which are themselves superimposed by temporal shift of T/2 on 2·T, i.e. on a length of 2·M. This superimposition thus forms a block called a "packet" with a length 2·M of OFDM/OQAM symbols delivered by the modulation according to the invention of a block of 4·M pieces of real data and thus comprising 4·M modulated carriers superimposed on a length 2·M. According to this representation, a "packet" of a length 2·M therefore comprises two "elementary blocks" of a length M.

Thus, according to the invention, the novel architecture for the modulation by blocks enables the reconstitution of a half-symbol at each end of the frame. Since the two half-symbols at the ends are truncated, discontinuity is obtained between two consecutive half-symbols belonging to adjacent blocks (elementary blocks or packets depending on the value of nb), as can be seen in FIG. 3B (discontinuity between 330 and 340).

Indeed, the pieces of data that the half-symbols transmit on each carrier are not the same ("rising" and "descending"), and this is what creates this discontinuity. The shorter the duration of the frame, the higher the discontinuity.

5.2.2 System of Demodulation

Figure 4:
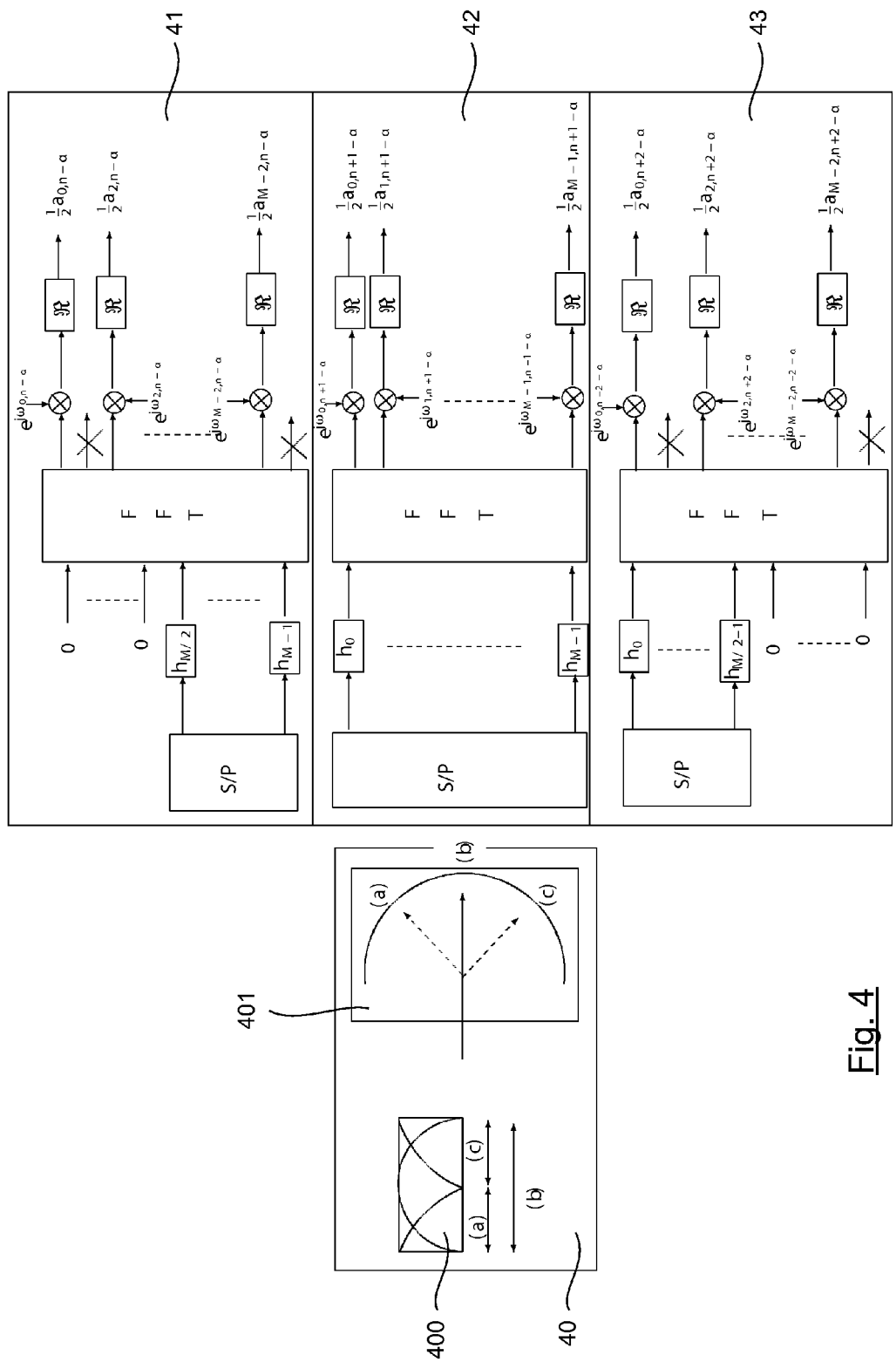
FIG. 4 illustrates the method for demodulating according to one embodiment of the invention.

The demodulator scheme, carrying out the dual operations of the OFDM/OQAM "block modulator" of FIG. 2, is shown in FIG. 4.

Thus, in a manner reciprocal to that of the modulation method, the demodulating block implements the method of demodulation according to the invention by implementing mainly the following steps for a received block of OFDM/OQAM symbols (400) of a length nb·M/2:

- extraction (40) of first, second and third sets of modulated carriers of the block of OFDM/OQAM symbols after application of time shifts so as to obtain a first set of M/2 first modulated carriers, a second set of nb·M/2 modulated carriers and a third set of M/2 last modulated carriers;
- first demodulation (41) for a first demodulator of the first set of M/2 first modulated carriers delivering M/2 first pieces of data of a real data block corresponding to the received block OFDM/OQAM symbols (400);
- second demodulation (42) by a second demodulator of the second set of nb·M/2 modulated carriers delivering (nb−1)·M following pieces of data of the data block;
- third demodulation (43) by a third demodulator of the third set of M/2 last modulated carriers delivering M/2 last pieces of data of the data block.

Indeed, at input of the block demodulator according to the invention, a block for example is received, called an "elementary block" with a length M of OFDM/OQAM symbols delivered by the modulation of a block of 2·M pieces of real data as described here above.

On the basis of a perfect synchronization, the step of extraction consists in feeding the first demodulation with the M/2 first modulated carriers (the carriers of index k, such as $$0 \le k \le \frac{M}{2} - 1\Big)$$

of the received block of OFDM/OQAM symbols, the second demodulation with the totality of the M modulated carriers (the modulated carriers of index k, such that 0≤k≤M−1) of the "elementary block" of the length M of OFDM/OQAM symbols, and the third demodulation with the M/2 last modulated carriers (the carriers of index k, such that $$\frac{M}{2} \le k \le M - 1\Big)$$

of the same "elementary block".

From a received OFDM/OQAM "elementary block" of a length M, the method of demodulation according to the invention delivers 2·M pieces of real data corresponding to 2·M modulated carriers superimposed on the length M of the "elementary block" received.

Indeed, taking advantage of the orthogonality of the carriers modulated and superimposed by the modulator block, the demodulator block of the invention "sees" at input M modulated carriers which it demodulates and "de-superimposes" in order to deliver the corresponding 2·M pieces of real data.

Similarly, should the received block of OFDM/OQAM symbols correspond to a "packet" (nb>2) of a length nb·M/2, the first and second demodulations are fed in the same way as in the case of the "elementary block" while the second demodulation is fed with nb·M/2 modulated carriers.

Thus, in the case represented with reference to FIG. 3B where nb=4, the block demodulator receives a packet of OFDM symbols of a length 2·M, the 2·M modulated carriers "seen" by the demodulator blocks therefore feed the second modulation which delivers at output 3·M real pieces of data.

Furthermore, according to the embodiment shown with reference to FIG. 4, the method of demodulation according to the invention comprises a switching step (401) feeding, for each block of OFDM/OQAM symbols with the length nb·M/2 received:

- the input of the first demodulator with the first set of M/2 first modulated carriers;
- the input of the second demodulator with the second set of nb·M/2 modulated carriers;
- the input of the third demodulator with the third set of M/2 last modulated data carriers.

This switching operation sets up a cadence by feeding the first demodulator for a duration T/2, the second demodulator for a duration T, and third demodulator for a duration T/2.

Besides, in a manner that is dual to the modulation, the first demodulation (41) comprises the following successive sub-steps:

- series/parallel conversion of M/2 first modulated carriers, delivering M/2 first parallel modulated carriers at output of a first series/parallel converter;
- filtering applied to the M/2 first parallel modulated carriers, delivering M first filtered modulated carriers, of which the M/2 first filtered modulated carriers are zero;
- implementing a forward fast Fourier transform fed with the M first filtered modulated carriers delivering M first demodulated pieces of data, of which one in two is zero.

Besides, according to this embodiment and classically, the pieces of demodulated data are multiplied by the term $$e^{j\omega_{m,n-\alpha}} = e^{-j\frac{\pi}{2}(n-\alpha)} e^{j\frac{\pi}{2}m\frac{(N-1)}{N}}$$

with the length of the prototype filter L=M=2N, which means, given the relationship L=αN−β+1, that α=2 and β=1, α and β corresponding to delay terms. Then, the real part of each piece of demodulated data obtained is isolated. In this embodiment, based on a causal scheme, the input of the demodulator must be delayed by a period of sampling (such a delay is not presented in FIG. 4).

It must be noted that according to other embodiments, not shown, non-causal schemes using multiplication by different exponential factors could also be used.

Furthermore, as indicated here above with reference to the document by C. Siclet, "*Application de la théorie des bancs de filtres à l'analyse and à la conception de modulations multiporteuses orthogonales and biorthogonales*", (Application of the theory of filter banks to the analysis and design of orthogonal and bi-orthogonal multicarrier modulations), University of Rennes 1 (France), PhD thesis defended on 18 Nov. 2002, it is possible instead of the forward fast Fourier transform (FFT) shown in FIG. 4, to use an inverse fast Fourier transform (IFFT).

Besides, the second demodulation (42) comprises the following successive sub-steps:

- series/parallel conversion of the nb·M/2 modulated carriers delivering (nb−1) sets of M second parallel modulated carriers at output of a second series/parallel converter;
- filtering of a length M applied to the (nb−1)·M second modulated carriers, delivering (nb−1) sets of M second filtered modulated carriers;

implementing (nb−1) successive forward fast Fourier transforms fed with the (nb−1) sets of M second filtered modulated carriers, delivering (nb−1)·M second pieces of demodulated real data, i.e. on (nb−1) durations T (if nb=2, as represented here, then a single forward fast Fourier transform is implemented, and if nb=4 which is not represented here, then three forward fast Fourier transforms would be implemented).

In particular, for nb>2, the second modulator implements (nb−1) series/parallel conversions of M second modulated carriers, i.e. the second modulated carriers of an index 0≤k≤M−1 undergo series/parallel conversion and then the set of the second modulated carriers of index $$\frac{M}{2} \le k \le \frac{3M}{2} - 1$$

undergoes series/parallel conversion and so on and so forth up to the set of second modulated carriers having an index $$\frac{(nb-1)M}{2} \le k \le \frac{nb \cdot M}{2} - 1.$$

Thus, the (nb−1) series/parallel conversions are respectively fed with the (nb−1) sets of M second modulated carriers shifted relative each other by M/2 second modulated carriers.

In the same way as mentioned here above, the demodulated pieces of data are multiplied by exponential factors as mentioned here above for example.

Furthermore, as indicated here above, it is also possible instead of the forward fast Fourier transform (FFT) shown in FIG. 4, to use an inverse fast Fourier transform (IFFT).

Furthermore, a third demodulation (43) comprises the following successive sub-steps:
series/parallel conversion of M/2 last modulated carriers delivering M/2 last parallel modulated carriers at output of a third series/parallel converter;
filtering applied to the M/2 last parallel modulated carriers, delivering M last filtered modulated carriers, of which the M/2 filtered last modulated carriers are zero;
implementing a forward fast Fourier transform fed with the M last filtered modulated carriers, delivering M last demodulated data, of which one piece of data in two is zero.

In the same way as mentioned here above, the demodulated pieces of data are multiplied by terms exponentially as mentioned here above for example.

Furthermore, as indicated here above, it is also possible instead of the forward fast Fourier transform (FFT) shown in FIG. 4, to use an inverse fast Fourier transform (IFFT).

According to this particular embodiment, the outputs of the three series/parallel converters will respectively feed the three inputs of the forward or inverse fast Fourier transform modules.

According to the embodiment shown with reference to FIG. 4, the first and third Fourier transform modules work by respectively feeding the three inputs of the forward or inverse fast Fourier transform modules for a duration T, (nb−1)·T, and T.

The implementing of the block demodulator shown with reference to FIG. 4 also indicates that even if the processing of demodulation enables the perfect reconstruction of the original data including that situated in the sub-blocks of edges (a) and (c) coming from the "sub-division" performed during the modulation, the amplitude of these pieces of data is divided by two. This can be explained by the reduction of power introduced at the modulator by cancellation of one sub-carrier in two.

Thus, advantageously according to one particular aspect of the invention, referring to FIGS. 2 and 4 on modulation and demodulation, it is necessary to multiply by two the carriers associated with the sub-blocks of data of edges (a) and (c).

In order to prevent an amplification of the noise at reception, this multiplier factor by two is according to the invention distributed equitably between modulation and demodulation.

Thus, according to one particular aspect of the invention, which is not shown, a multiplication by $\sqrt{2}$ is implemented during the modulation and the demodulation without increasing the complexity of the implementation. Indeed, both during modulation and demodulation, the pre-processing and post-processing operations imply multiplications for each carrier.

According to one particular embodiment, the content of these multipliers can be pre-computed in tables taking account of this corrective factor.

5.2.3 Variants of Embodiment and Performance

In order to optimize the complexity of the block modulator and demodulator described here above, an alternative embodiment is presented here below.

As seen here above, the invention proposes a processing of the M/2 real pieces of data corresponding to the edges of a stream of real pieces of data to be modulated distinctly from the central part comprising (nb−1)·M real pieces of data.

If we consider the preconceptions of those skilled in the art, it can seem that carrying out a processing of the edges distinct from that of the central part increases the complexity.

However, as shown here below, the specific treatment proposed according to the invention leads on the contrary to reducing the complexity of the modulation/demodulation system.

In order to make this demonstration, first of all the invention determines the complexity of an inverse fast Fourier transform (IFFT), the inputs of which contain half of zeros denoted as $\text{IFFT}_{mz}$.

According to this demonstration, it is considered especially that the length of the OFDM/OQAM prototype filter is equal to M, and according to this assumption, we obtain the relationships of conjugation between the terms $u_{k,n}$ of the outputs of IFFT followed by 0≤k≤M/2−1:

$$\begin{cases} u_{k,n} = (-1)^n u^*_{M/2-k-1,n} \\ u_{M/2+k,n} = (-1)^n u^*_{M-k-1,n} \end{cases} \quad (1)$$

with:

$u_{m,n}$ a transformed symbol associated with the output with index m of the frequency/time transformation step 12 at an instant n;

* the conjugate operator.

Furthermore, if according to the invention half of the IFFT inputs having odd-parity indices are at zero (similar relationships being obtained if the even-parity indices are at zero) for 0≥k≥M/2−1, the following relationships are obtained:

$$u_{k,n} = e^{j\frac{\pi}{2}n} \sum_{p=0,m=2p}^{M/2-1} a_{m,n} e^{-j\frac{\pi}{2}m\frac{D-N}{N}} e^{j2\pi\frac{mk}{N}} \quad (2)$$

$$= e^{j\frac{\pi}{2}n} \sum_{p=0,m=2p}^{M/2-1} a_{m,n} e^{-j\frac{\pi}{2}2p\frac{2N-1-N}{N}} e^{j2\pi\frac{2pk}{N}}$$

$$= e^{j\frac{\pi}{2}n} \sum_{p=0,m=2p}^{M/2-1} a_{m,n} e^{-j\pi p} e^{j\frac{\pi p}{N}} e^{j2\pi\frac{2pk}{N}}$$

$$u_{M/2+k,n} = e^{j\frac{\pi}{2}n} \sum_{p=0,m=2p}^{M/2-1} a_{m,n} e^{-j\frac{\pi}{2}2p\frac{2N-1-N}{N}} e^{j2\pi\frac{2p(k+M/2)}{N}} \quad (3)$$

$$= e^{j\frac{\pi}{2}n} \sum_{p=0,m=2p}^{M/2-1} a_{m,n} e^{-j\pi p} e^{j\frac{\pi p}{N}} e^{j2\pi\frac{2pk}{N}}$$

$$= u_{k,n}$$

According to the relationships (1) and (3) it is shown that only a quarter of outputs of the IFFTmz is needed to compute the totality of the outputs, knowing that only half of these outputs is necessary in the block modulator.

Thus, if this quarter of outputs is chosen from among the even-parity indices, it is possible to restitute half of the outputs needed for the demodulation, i.e. the outputs of indices ranging from M/2 to M−1 for IFFTmz of the sub-block (a) and ranging from 0 to M/2−1 for IFFTmz of the sub-block (c).

One algorithm known for computing IFFTmz with the smallest possible operational complexity is, as in the case of the IFFT of the sub-block (b), the one based on the frequency decimation (DIF) such as described in the document by Y. Dandach and P. Siohan, "*FBMC/OQAM modulators with half complexity*", Proceedings Globecom'11, Houston, Tex., 2011, the authors of which are also the inventors of the present application. Indeed, by using the "split-radix" algorithm as described in the document by P. Duhamel and H. Hollman, "*Implementation of "split-radix" FFT algorithms for complex, real and real symmetric data*", IEEE International conference on Acoustics, Speech, and Signal Processing ICASSP 85, Vol 10, April 1985, pp 784-787, with decimation in frequency (DIF), the complexity for computing IFFTmz sized M is equivalent to that for computing an IFFT of size M/4 plus M/4+M/8 complex additions as shown in FIG. 5 for M=32, where the notation $W^p$ is such that $$W^p = e^{j\frac{2\pi p}{M}}.$$

The M/4+i/8 complex additions come from the computation of the inputs of the IFFT sized 3M/4 as can be seen in FIG. 5 in taking account of the fact that the inputs of odd-parity indices of IFFTmz are zero. In this case, by using the result of the document by P. Duhamel and H. Hollman, "*Implementation of "split-radix" FFT algorithms for complex, real and real symmetric data*", IEEE International conference on Acoustics, Speech, and Signal Processing ICASSP 85, Vol 10, April 1985, PP 784-787, the complexity of the IFFTmz is equivalent to M/4 log₂ M−5M/4+4 real multiplications (μR) and 3M/4 log₂ M−3M/2+4 real additions (αR).

This means that a comparison can be made between the complexities of the OFDM/OQAM block modulator according to the invention and an OFDM/OQAM modulator of the prior art according to the document by Y. Dandach and P. Siohan, "*FBMC/OQAM modulators with half complexity*", Proceedings Globecom'11, Houston, Tex., 2011 can be set up.

The complexity associated with the processing of the sub-block (b) is equal to that of the prior art modulator, namely 3M/2 log₂ M−2M+4 (αR) and M/2 log₂ M−2M+4 (μR).

The total complexity for the sub-blocks (a) and (c) is equivalent to that of the two IFFTmz and therefore enables a gain of M−4 (αR) and M/2−4 (μR).

At the demodulation of the two semi-symbols corresponding to the sub-blocks of data (a) and (c), two "pruned" forward fast Fourier transforms (FFTs), i.e. transforms for which half (upper or lower) of the inputs is equal to zero as shown with reference to FIG. 4, are implemented, and only the outputs having even-parity indices are therefore to be computed.

As mentioned here above, it is possible according to the invention to use a forward or inverse fast Fourier transform for the modulation. The modifications that have respectively to be implemented for the application of either of these forward or inverse transforms during the modulation are especially described in the document by C. Siclet, "*Application de la théorie des bancs de filtres à l'analyse and à la conception de modulations multiporteuses orthogonales and biorthogonales*" (Application of the theory of filter banks to the analysis and design of orthogonal and bi-orthogonal multicarrier modulations), University of Rennes 1 (France), PhD thesis defended on 18 Nov. 2002, and correspond essentially to modifications of the phase terms implemented.

It is therefore also possible to apply a reduction of complexity to the demodulator. As in the case of the IFFTmz dealt with here above, the complexity of such a "pruned" FFT is equivalent to that of a forward fast Fourier transform (FFT) sized M/2 by using the "split radix" algorithm with decimation in frequency (DIF).

This forward fast Fourier transform (FFT) is shown in FIG. 6.

The complexity needed to demodulate a semi-symbol is therefore equivalent to 3M/2 log₂ M−3M+4 (αR) and M/2 log₂ M−2M+4 (μR).

For a conventional FBMC/OQAM demodulator, the complexity of the inverse fast Fourier transform (IFFT) in demodulating each symbol is equivalent to 3M log₂ M−3M+4 (αR) and M log₂ M−3M+4 (μR).

Consequently, the demodulation of the two semi-symbols of the modulator according to the invention is less costly than the demodulation of a symbol coming from a conventional modulator and enables a reduction of complexity of 3M−4 (αR) and de M−4 (μR).

Finally, with regard to FIG. 6 (and especially the lower part), if the odd-parity indices are used, the complexity for demodulating these two edge semi-symbols is less reduced than in the case where the even-parity indices (60) are used. Indeed, the demodulation of odd-parity indices implies complex operations of multiplication that are costlier.

This is why the inventors have proposed an improvement in terms of complexity of the OFDM/OQAM modulator by blocks according to the invention, in forcing to zero the pieces of parallel data having odd-parity indices feeding the first and third modulations implementing forward or inverse fast Fourier transforms (FFT or IFFT) fed with M pieces of parallel data, of which the pieces of parallel data with odd-parity indices are forced to zero.

The performance of the modulation/demodulation ("modem") system according to the invention relative to the prior art is represented with reference to FIG. 9.

Indeed, this FIG. 9 represents the effect of the discontinuity created by the truncation of the real data at the edges of a packet on the power spectral density (PSD). The prototype filter used is the time filter (TFL) with a number of carriers M=128 and L=M.

In FIG. 9, the curve (93) representing the discontinuity associated with the modulation processing according to the invention for the case where two pieces of real data are truncated in a block of three pieces of real data (OFDM/OQAM-2/3) shows that the power spectral density of the signal is slightly impaired but that it is nevertheless better than that (94) associated with classic OFDM processing.

Furthermore, the effect of the discontinuity diminishes when the duration of the packet increases, especially for two pieces of truncated real data on fifteen pieces of real modulated data per packet (OFDM/OQAM-2/15, curve (92)).

5.3 Structure of the Modulator and Demodulator

Finally, we present respectively with reference to FIGS. 7 and 8, the simplified structure of an OFDM/OQAM or BFDM/OQAM modulator by blocks (FIG. 7) and a demodulator by blocks (FIG. 8) implementing a modulation/demodulation technique according to the example described here above.

Such a modulator by blocks comprises a memory 71 comprising a buffer memory, a processing unit 72, equipped for example with a microprocessor μP, and driven by the computer program 73 implementing the method of modulation according to the invention.

At initialization, the computer program code instructions 73 are for example loaded into a RAM and then executed by the processor of the central processing unit 72. The central processing unit 72 receives at input a stream of real data. The microprocessor of the processing unit 72 implements the steps of the method of modulation described here above according to the instructions of the computer program 73 to perform a modulation by blocks of the stream of real data received grouped into data blocks of nb·M pieces of real data, where M is the number of carriers of one of the OFDM/OQAM blocks of symbols and nb is an integer greater than or equal to 2.

To this end, the modulator comprises, in addition to the buffer memory 71, first means of modulation by a first modulator of the M/2 first pieces of data of the real data block, delivering a first set of modulated carriers, second means of modulation by a second modulator of the (nb−1)·M following pieces of data of the real data block, delivering a second set of (nb−1)·M modulated carriers, third means of modulation by a third modulator of the M/2 last pieces of data of the real data block, delivering a third set of modulated carriers, means for superimposing first, second and third sets of modulated carriers with application of time shifts, so as to form a block of OFDM/OQAM symbols of a length nb·M/2, the first set being superimposed temporally on the start of the second set and the third set being superimposed temporally on the end of the second set.

These means are driven by the microprocessor of the processing unit 72.

FIG. 8 reciprocally represents the demodulator by blocks according to the invention.

Such a demodulator by blocks comprises a memory 81 comprising a buffer memory, a processing unit 82 equipped for example with a microprocessor μP, and driven by the computer program 83 implementing the method of demodulation according to the invention.

At initialization, the computer program code instructions 83 are for example loaded into a RAM and then executed by the processor of the processing unit 82. The processing unit 82 receives at input OFDM/OQAM blocks of symbols of a length nb·M/2 obtained by the method of modulation described here above. The microprocessor of the processing unit 82 implements the steps of the method of demodulation described here above according to the instructions of the computer program 83 to carry out a demodulation by blocks of the received blocks of OFDM/OQAM symbols having a length nb·M/2, where M is the number of carriers of one of the blocks of OFDM/OQAM symbols and nb is an integer greater than or equal to 2.

To this end, the demodulator comprises, in addition to the buffer memory 81, means for extracting first, second and third sets of modulated carriers from the block of OFDM/OQAM symbols after actuation of the time shifts so as to obtain a first set of M/2 first modulated carriers, a second set of nb·M/2 modulated carriers and a third set of M/2 last modulated carriers, first means for demodulation by a first demodulator of the first set of M/2 first modulated carriers delivering M/2 first pieces of data of a real data block corresponding to the received block of OFDM/OQAM symbols, second means of demodulation by a second demodulator of the second set of nb·M/2 modulated carriers delivering (nb−1)·M following pieces of data of the real data block, third means of demodulation by a third demodulator of the third set of M/2 last modulated carriers delivering M/2 last pieces of data of the real data block.

The invention claimed is:

1. A method comprising:
   modulating using a processing device a stream of real data, said modulating implementing a prototype filter of a length smaller than or equal to M, and said modulating delivering blocks of OFDM/OQAM symbols,
   wherein pieces of said real data are grouped together in blocks of data of nb×M real data where "×" is a multiplication operator, M is the number of carriers of one of said blocks of OFDM/OQAM symbols and nb is an integer greater than or equal to 2,
   and wherein said modulating comprises, for a real data block:
      first modulating by a first modulator of the M/2 first pieces of data of said real data block, delivering a first set of modulated carriers at an input of said prototype filter, said prototype filter delivering a first set of M/2 filtered modulated carriers;
      second modulating by a second modulator of the (nb−1)×M following pieces of data of said real data block, delivering a second set of (nb−1)×M modulated carriers at the input of said prototype filter, said prototype filter delivering (nb−1) second sets of M filtered modulated carriers;
      third modulating by a third modulator of the M/2 last pieces of data of said real data block delivering a third set of modulated carriers at the input of said prototype filter, said prototype filter delivering a third set of M/2 filtered modulated carriers;
      superimposing of said first, second and third sets of filtered modulated carriers, said superimposing taking into account time shifts applied previously and respectively to said M/2 first pieces of data, (nb−1)×M following pieces of data and M/2 last pieces of data, so as to form one of said blocks of OFDM/OQAM symbols with length nb×M/2, said first set being temporally superimposed on the start of a second set and said third set being temporally superimposed on the end of the second set,
   wherein said first modulating and third modulating implement forward fast Fourier transforms or inverse fast Fourier transforms (FFTs or IFFTs) fed with M pieces of parallel data, one in two of which is forced to zero wherein said first modulating and third modulating respectively implement an expanding of said M/2 first pieces of data of said real data block and said M/2 last pieces of data of said real data block, said expanding comprising inserting a zero between each of said M/2 first pieces of data of said real data block and each of said M/2 last pieces of data of said real data block respectively delivering, at an input of said forward or inverse fast Fourier transforms of said first modulating and third modulating, M expanded first pieces of data of said real block and M expanded last pieces of data of said real data block, of which one in two pieces of data is forced to zero.

2. The method according to claim 1, wherein said modulating comprises a switching step that feeds, for each real data block:
   an input of said first modulator with M/2 first pieces of data of said real data block;
   an input of said second modulator with (nb−1)×M following pieces of data of said real data block;
   an input of said third modulator with M/2 last data of said real data block.

3. The method according to claim 1, wherein said modulating, implementing said prototype filter with a length smaller than or equal to M, carrying out two distinct types of filtering, applying one filtering to the second set of (nb−1)×M modulated carriers, and applying the other filtering to said first set of modulated carriers and to said third set of modulated carriers delivering a first and a third set each comprising M/2 filtered modulated carriers.

4. The method according to claim 1,
   wherein said first modulating comprises the following successive sub-steps:
      expanding said M/2 first pieces of data of said real data block, said expanding including insertion of a zero between each of said M/2 first pieces of data of said real data block delivering M expanded first pieces of data of said block,
      series/parallel converting of said M expanded first pieces of data of said data block, delivering M parallel pieces of data at output of a first series/parallel converter,
      implementing a forward or inverse fast Fourier transform (FFT or IFFT) fed with said pieces of parallel data output from said first series/parallel converter of which one in two is forced to zero by said operation of expanding of said M/2 first pieces of data, delivering M first modulated carriers,
      filtering applied to said M first modulated carriers, delivering M/2 first filtered modulated carriers, said filtering being performed by said prototype filter,
      parallel/series converting of said M/2 first filtered modulated carriers delivering said first set of modulated carriers, and
   said second modulating comprises the following successive sub-steps:
      series/parallel converting of said (nb−1)×M following pieces of data of said real data block, delivering (nb−1)×M pieces of parallel data at output of a second series/parallel converter,
      implementing (nb−1) successive forward or inverse fast transforms (FFT or IFFT) fed with said (nb−1)×M pieces of parallel data at output of said second series/parallel converter delivering (nb−1)×M second modulated carriers,
      filtering of length M applied to said (nb−1)×M second modulated carriers delivering (nb−1) sets of M second filtered modulated carriers, said filtering being performed by said prototype filter,
      parallel/series converting of said (nb−1) sets of M second filtered modulated carriers delivering said second set of (nb−1)×M modulated carriers, and
   said third modulating comprises the following successive sub-steps:
      expanding of said M/2 last pieces of data of said block, said expanding including insertion of a zero between each of said M/2 last pieces of data of said real data block, delivering M third pieces of expanded data of said block;
      series/parallel converting of said M third pieces of expanded data of said real data block, delivering M pieces of parallel data at output of a third series/parallel converter,
      implementing a forward or inverse fast Fourier transform (FFT or IFFT) fed with said M pieces of parallel data at output of said third series/parallel converter, one in two of which is forced to zero by said operation of expanding of said M/2 last pieces of data delivering M third modulated carriers,
      filtering applied to said M third modulated carriers delivering M/2 third filtered modulated carriers, said filtering being performed by said prototype filter,
      parallel/series converting of said M/2 third filtered modulated carriers delivering the third set of modulated carriers.

5. The method according to claim 1, wherein said method furthermore comprises multiplying by a factor equal to 2 of the amplitude of said M/2 first pieces of data of said real data block and said M/2 last pieces of data of said real data block.

6. The method according to claim 1, wherein said first modulating and third modulating implement forward or inverse fast Fourier transforms (FFT or IFFT) fed with M pieces of parallel data, of which the pieces of parallel data with odd-parity indices are forced to zero.

7. A method comprising:
   demodulating using a processing device an OFDM/OQAM type multicarrier signal comprising blocks of OFDM/OQAM symbols of a length nb×M/2, said demodulating implementing a prototype filter of a length smaller than or equal to M and said demodulating delivering, for one of said blocks of OFDM/OQAM symbols of a length nb×M/2, a block of nb×M real data, called a real data block, where "×" is a multiplication operator, M is the number of carriers of one of said OFDM/OQAM symbols and nb is an integer greater than or equal to 2,
   wherein said demodulating comprises, for a received block of OFDM/OQAM symbols with a length nb×M/2:
      extracting first, second and third sets of modulated carriers from said block of OFDM/OQAM symbols after application of time shifts, so as to obtain a first set of M/2 first modulated carriers, a second set of nb×M/2 following modulated carriers and a third set of M/2 last modulated carriers;
      during a first demodulating implemented by a first demodulator, applying said prototype filter, to said first set of M/2 first modulated carriers, said prototype filter delivering M filtered modulated carriers, of which M/2 first filtered modulated carriers are zero, at an input of a first forward fast Fourier transform, of said first demodulator, said first forward fast Fourier transform delivering M first demodulated first data, of which one in two is zero, of a real data block corresponding to said received block of OFDM/OQAM symbols;

during a second demodulating implemented by a second demodulator, applying said prototype filter to (nb−1)×M second modulated carriers provided by a series/parallel conversion applied to said second set of nb×M/2 following modulated carriers, said prototype filter delivering (nb−1) second sets of M second filtered modulated carriers at an input of (nb−1) successive forward fast Fourier transforms, of said second demodulator, delivering (nb−1)×M following demodulated data of said real data block;

during a third demodulating implemented by a third demodulator, applying said prototype filter to said third set of M/2 last modulated carriers, said prototype filter delivering M last filtered modulated carriers, of which M/2 last filtered modulated carriers are zero at an input of a last forward fast fourier transform of said last forward fast fourier transform delivering M last demodulated data, of which one piece of data in two is zero, of said real data block.

8. A device for modulating a stream of real data, wherein the device comprises:

a prototype filter with a length smaller than or equal to M, said device delivering blocks of OFDM/OQAM symbols, wherein pieces of said real data are grouped together in blocks of data of nb×M pieces of real data, where "×" is a multiplication operator, M is the number of carriers of one of said blocks of OFDM/OQAM symbols and nb in an integer greater than or equal to 2, wherein said device comprises the following elements processing a real data block:

a first modulator configured to modulate the M/2 first pieces of data of said real data block delivering a first set of modulated carriers at an input of said prototype filter, said prototype filter delivering a first set of M/2 filtered modulated carriers;

a second modulator configured to modulate the (nb−1)×M following pieces of data of the real data block, delivering a second set of (nb−1)×M modulated carriers at the input of said prototype filter, said prototype filter delivering (nb−1) second sets of M filtered modulated carriers;

a third modulator configured to modulate the M/2 last pieces of data of the real data block, delivering a third set of modulated carriers at the input of said prototype filter, said prototype filter delivering a third set of M/2 filtered modulated carriers;

means for superimposing said first, second and third sets of filtered modulated carriers, said means for superimposing taking into account time shifts applied previously and respectively to said M/2 first pieces of data, (nb−1)×M following pieces of data and M/2 last pieces of data, so as to form one of said blocks of OFDM/OQAM symbols with a length nb×M/2, said first set being superimposed temporally on the start of said second set and said third set being superimposed temporally on the end of said second set, and wherein said first modulator and third modulator implement forward fast Fourier transforms or inverse fast Fourier transforms (FFTs or IFFTs) fed with M pieces of parallel data, one in two of which is forced to zero wherein said first modulator and third modulator respectively implement an expanding of said M/2 first pieces of data of said real data block and said M/2 last pieces of data of said real data block, said expanding comprising inserting a zero between each of said M/2 first pieces of data of said real data block and each of said M/2 last pieces of data of said real data block respectively delivering, at an input of said forward or inverse fast Fourier transforms of said first modulator and third modulator, M expanded first pieces of data of said real block and M expanded last pieces of data of said real data block, of which one in two pieces of data is forced to zero.

9. A device for demodulating an OFDM/OQAM type multicarrier signal comprising blocks of OFDM/OQAM symbols of a length nb×M/2, wherein the device for demodulating comprises:

a prototype filter of a length smaller than or equal to M, wherein said device for demodulating delivers, for one of said blocks of OFDM/OQAM symbols of a length nb×M/2, a block of nb×M real data, where "×" is a multiplication operator, M is the number of carriers of one of said blocks of OFDM/OQAM symbols and nb is an integer greater than or equal to 2, and wherein said device for demodulating comprises, for a received block of OFDM/OQAM symbols with a length nb×M/2:

means for extracting first, second and third sets of modulated carriers of said block of OFDM/OQAM symbols, after application of time shifts, so as to obtain a first set of M/2 first modulated carriers and a second set of nb×M/2 following modulated carriers and a third set of M/2 last modulated carriers;

a first demodulator, wherein said prototype filter filters said first set of M/2 first modulated carriers, said prototype filter delivering M filtered modulated carriers, of which M/2 first filtered modulated carriers are zero, at an input of a first forward fast Fourier transform, of said first demodulator, said first forward fast Fourier transform delivering M first demodulated first data, of which one in two is zero, of a real data block corresponding to said received block of OFDM/OQAM symbols;

a second demodulator, wherein said prototype filter filters (nb−1)×M second modulated carriers provided by a series/parallel conversion applied to said second set of nb×M/2 following modulated carriers, said prototype filter delivering (nb−1) second sets of M second filtered modulated carriers at an input of (nb−1) successive forward fast Fourier transforms, of said second demodulator, delivering (nb−1)×M following demodulated data of said real data block;

a third demodulator, wherein said prototype filter filters said third set of M/2 last modulated carriers, said prototype filter delivering M last filtered modulated carriers, of which M/2 last filtered modulated carriers are zero at an input of a last forward fast fourier transform of said last forward fast fourier transform delivering M last demodulated data, of which one piece of data in two is zero, of said real data block.

10. A non-transitory computer-readable memory comprising a computer program stored thereon and comprising instructions for implementing a method of modulating, when said program is executed by a processor, wherein the method comprises:

modulating a stream of real data, by the processor, said modulating implementing a prototype filter of a length smaller than or equal to M, and said modulating delivering blocks of OFDM/OQAM symbols, wherein pieces of said real data are grouped together in blocks of data of nb×M real data where "×" is a multiplication operator, M is the number of carriers of one of said blocks of OFDM/OQAM symbols and nb is an integer greater than or equal to 2, wherein said modulating comprises, for a real data block:
- first modulating by a first modulator of the M/2 first pieces of data of said real data block, delivering a first set of modulated carriers at an input of said prototype filter, said prototype filter delivering a first set of M/2 filtered modulated carriers;
- second modulating by a second modulator of the (nb−1)×M following pieces of data of said real data block, delivering a second set of (nb−1)×M modulated carriers at the input of said prototype filter, said prototype filter delivering (nb−1) second sets of M filtered modulated carriers;
- third modulating by a third modulator of the M/2 last pieces of data of said real data block delivering a third set of modulated carriers at the input of said prototype filter, said prototype filter delivering a third set of M/2 filtered modulated carriers;
- superimposing of said first, second and third sets of filtered modulated carriers, said superimposing taking into account time shifts applied previously and respectively to said M/2 first pieces of data, (nb−1)×M following pieces of data and M/2 last pieces of data, so as to form one of said blocks of OFDM/OQAM symbols with length nb×M/2, said first set being temporally superimposed on the start of a second set and said third set being temporally superimposed on the end of the second set, and wherein said first modulating and third modulating implement forward fast Fourier transforms or inverse fast Fourier transforms (FFTs or IFFTs) fed with M pieces of parallel data, one in two of which is forced to zero wherein said first modulating and third modulating respectively implement an expanding of said M/2 first pieces of data of said real data block and said M/2 last pieces of data of said real data block, said expanding comprising inserting a zero between each of said M/2 first pieces of data of said real data block and each of said M/2 last pieces of data of said real data block respectively delivering, at an input of said forward or inverse fast Fourier transforms of said first modulating and third modulating, M expanded first pieces of data of said real block and M expanded last pieces of data of said real data block, of which one in two pieces of data is forced to zero.

* * * * *

UNITED STATES PATENT AND TRADEMARK OFFICE
CERTIFICATE OF CORRECTION

PATENT NO. : 9,240,918 B2  
APPLICATION NO. : 14/371960  
DATED : January 19, 2016  
INVENTOR(S) : Pierre Siohan et al.

Page 1 of 1

It is certified that error appears in the above-identified patent and that said Letters Patent is hereby corrected as shown below:

IN THE SPECIFICATION

Column 3, line 27, delete:

$$\varsigma = \frac{K}{K+q=0.5} \cdot \frac{2Q \cdot M \cdot B}{T} \text{ (bits/s/Hz)},$$

And insert therefor:

$$\varsigma = \frac{K}{K+q-0.5} \cdot \frac{2Q.M.B}{T} \text{ (bits/s/Hz)},$$

Column 24, line 58, delete the "," after "filter".

Signed and Sealed this  
Nineteenth Day of April, 2016

Michelle K. Lee  
*Director of the United States Patent and Trademark Office*